US012562317B2

(12) United States Patent
Tsubaki et al.

(10) Patent No.: US 12,562,317 B2
(45) Date of Patent: Feb. 24, 2026

(54) ELECTROLYTIC CAPACITOR AND LIQUID COMPONENT FOR ELECTROLYTIC CAPACITOR

(71) Applicant: Panasonic Intellectual Property Management Co., Ltd., Osaka (JP)

(72) Inventors: Yuichiro Tsubaki, Kyoto (JP); Kenta Chashiro, Osaka (JP); Hiroyuki Arima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 18/502,118

(22) Filed: Nov. 6, 2023

(65) Prior Publication Data

US 2024/0177941 A1 May 30, 2024

(30) Foreign Application Priority Data

Nov. 29, 2022 (JP) ................................. 2022-190712

(51) Int. Cl.
| | |
|---|---|
| *H01G 9/035* | (2006.01) |
| *C08K 5/053* | (2006.01) |
| *C08K 5/1539* | (2006.01) |
| *C08K 5/45* | (2006.01) |
| *H01G 9/025* | (2006.01) |
| *H01G 9/145* | (2006.01) |
| *H01G 9/15* | (2006.01) |

(52) U.S. Cl.
CPC ............. *H01G 9/035* (2013.01); *C08K 5/053* (2013.01); *C08K 5/1539* (2013.01); *C08K 5/45* (2013.01); *H01G 9/025* (2013.01); *H01G 9/145* (2013.01); *H01G 9/15* (2013.01)

(58) Field of Classification Search
CPC ........ H01G 9/035; H01G 9/025; H01G 9/145; H01G 9/15
See application file for complete search history.

(56) References Cited

U.S. PATENT DOCUMENTS

| 2012/0300368 A1 | 11/2012 | Matsuura et al. | |
|---|---|---|---|
| 2018/0233292 A1* | 8/2018 | Tsubaki | ................. H01G 9/035 |

(Continued)

FOREIGN PATENT DOCUMENTS

| WO | 2011/099261 | 8/2011 |
|---|---|---|

*Primary Examiner* — Timothy J. Dole
(74) *Attorney, Agent, or Firm* — Rimon P.C.

(57) ABSTRACT

An electrolytic capacitor includes a capacitor element and a liquid component. The capacitor element includes an anode body including a dielectric layer on a surface of the anode body, and a solid electrolyte layer covering at least a part of a surface of the dielectric layer. The solid electrolyte layer contains a conductive polymer component, and the liquid component contains a first polymer component. The first polymer component includes a carbon chain whose main chain does not contain a heteroatom at a position other than a terminal of the main chain. Units constituting the first polymer component include at least one first unit selected from the group consisting of a (meth)acrylic acid-based unit having a carboxy group and a vinyl alcohol-based unit having a hydroxy group. A proportion of the at least one first unit in an entirety of the units constituting the first polymer component is more than 50 mass %.

10 Claims, 2 Drawing Sheets

(56) References Cited

U.S. PATENT DOCUMENTS

| | | | | |
|---|---|---|---|---|
| 2021/0142953 A1* | 5/2021 | Tsubaki | ................. | H01G 9/035 |
| 2022/0344105 A1* | 10/2022 | Tsubaki | ................. | H01G 9/055 |
| 2023/0054448 A1* | 2/2023 | Onodera | ................. | C08L 79/02 |

* cited by examiner

ELECTROLYTIC CAPACITOR AND LIQUID COMPONENT FOR ELECTROLYTIC CAPACITOR

BACKGROUND

1. Technical Field

The present disclosure relates to an electrolytic capacitor and a liquid component for an electrolytic capacitor.

2. Description of the Related Art

As a small-sized, large-capacitance capacitor having a low equivalent series resistance (ESR), an electrolytic capacitor is seen as promising, the electrolytic capacitor including an anode body having a dielectric layer on the surface of the anode body, a conductive polymer covering at least a part of the dielectric layer, and an electrolytic solution.

In International Publication WO 2011/099261, "An electrolytic capacitor including: a capacitor element including an anode foil that includes a dielectric layer on the surface of the anode foil, a cathode foil, a separator disposed between the anode foil and the cathode foil, and a solid electrolyte layer in contact with the dielectric layer of the anode foil and the cathode foil; an electrolytic solution with which the capacitor element is impregnated; and an exterior body that seals the capacitor element together with the electrolytic solution, wherein the electrolytic solution contains a hardly volatile solvent that is at least one of polyalkylene glycol and a derivative of polyalkylene glycol" is proposed.

SUMMARY

One aspect of the present disclosure relates to an electrolytic capacitor including a capacitor element, and a liquid component. The capacitor element includes an anode body including a dielectric layer on a surface of the anode body, and a solid electrolyte layer covering at least a part of a surface of the dielectric layer. The solid electrolyte layer contains a conductive polymer component, and the liquid component contains a first polymer component. The first polymer component includes a carbon chain whose main chain does not contain a heteroatom at a position other than a terminal of the main chain. Units constituting the first polymer component include at least one first unit selected from the group consisting of a (meth)acrylic acid-based unit having a carboxy group and a vinyl alcohol-based unit having a hydroxy group. A proportion of the at least one first unit in an entirety of the units constituting the first polymer component is more than 50 mass %.

Another aspect of the present disclosure relates to a liquid component for an electrolytic capacitor. The liquid is used for the electrolytic capacitor including a solid electrolyte layer containing a conductive polymer component. The liquid component includes a first polymer component. The first polymer component includes a carbon chain whose main chain does not contain a heteroatom at a position other than a terminal of the main chain. Units constituting the first polymer component include at least one first unit selected from the group consisting of a (meth)acrylic acid-based unit having a carboxy group and a vinyl alcohol-based unit having a hydroxy group. A proportion of the at least one first unit in an entirety of the units constituting the first polymer component is more than 50 mass %.

According to the present disclosure, an electrolytic capacitor excellent in heat resistance can be provided.

DETAILED DESCRIPTIONS OF EMBODIMENT

Figure 1:
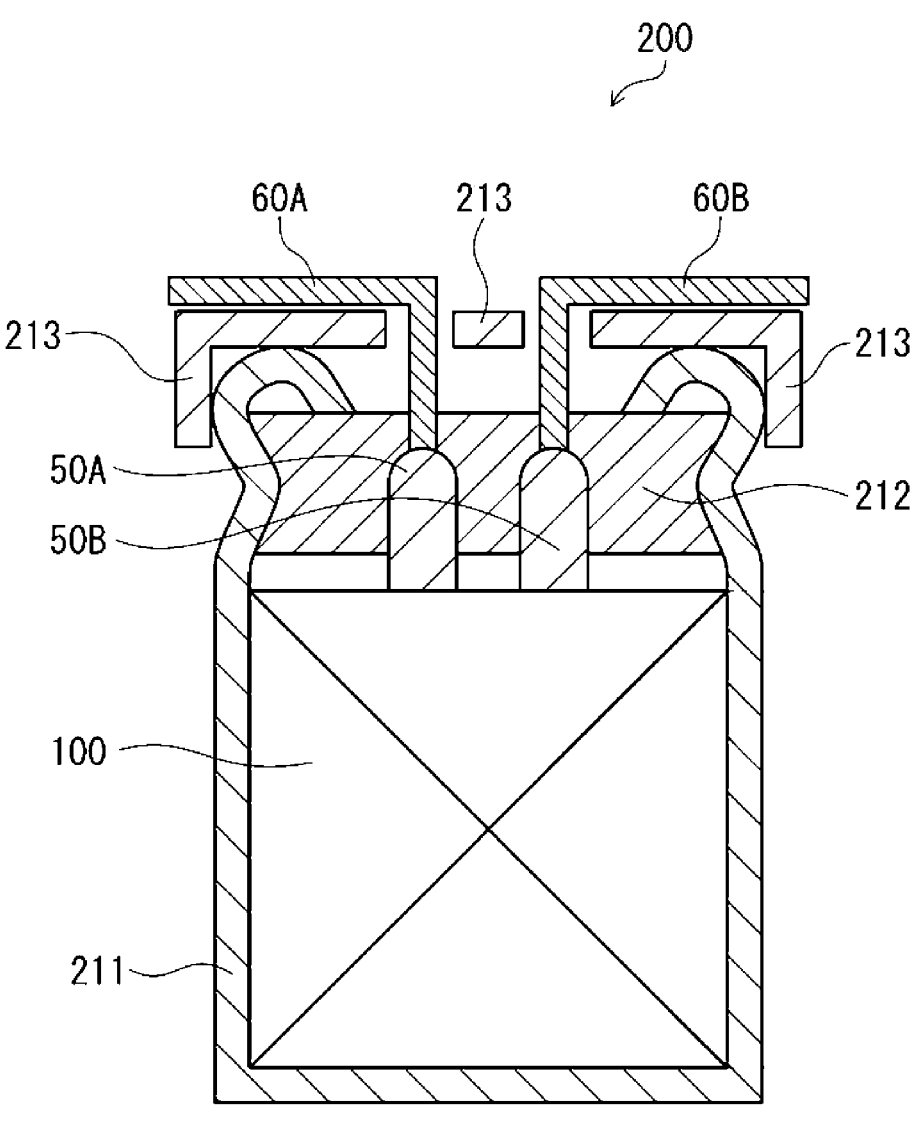
FIG. 1 is a sectional view schematically illustrating an example of an electrolytic capacitor according to one exemplary embodiment of the present disclosure.

Prior to the description of the exemplary embodiments of the present disclosure, problems to be solved by the present disclosure are briefly explained.

When an electrolytic capacitor is exposed to a high temperature atmosphere for a long time, the C—O bonds of the main chain in polyalkylene glycol are cut so that the molecular weight of the polyalkylene glycol is reduced, and thus the polyalkylene glycol may permeates through a sealing body disposed in an opening of a case in which a capacitor element and an electrolytic solution are contained. Accordingly, the function protecting the conductive polymer component by the electrolytic solution containing the polyalkylene glycol decreases, and oxidation degradation of the conductive polymer component may progress.

Hereinafter, an exemplary embodiment of the present disclosure will be described with reference to examples, but the present disclosure is not limited to the examples described below. Although specific numerical values and materials may be provided as examples in description below, other numerical values and materials may be applied as long as the effect of the present disclosure can be obtained. In this specification, the description "numerical value A to numerical value B" includes a numerical value A and a numerical value B, and can be read as "from numerical value A to numerical value B, inclusive". In the following description, in a case where lower limits and upper limits related to numerical values of specific physical properties, conditions, or the like are illustrated, any of the illustrated lower limits and any of the illustrated upper limits can be freely combined unless the lower limit is equal to or more than the upper limit. In a case where a plurality of materials are illustrated, one of the materials may be selected and used singly, or two or more of the materials may be used in combination.

Further, the present disclosure encompasses a combination of subject matters recited in two or more claims freely selected from a plurality of claims recited in the appended claims. That is, as long as no technical contradiction arises, matters recited in two or more claims freely selected from a plurality of claims recited in the appended claims can be combined.

An electrolytic capacitor according to an exemplary embodiment of the present disclosure includes a capacitor element and a liquid component. The capacitor element includes an anode body that includes a dielectric layer on the surface of the anode body, and a solid electrolyte layer that covers at least a part of a surface of the dielectric layer. The solid electrolyte layer contains a conductive polymer component. The liquid component is impregnated with the capacitor element (at least the solid electrolyte layer), and is in contact with the solid electrolyte layer and the dielectric layer.

The liquid component contains a first polymer component. The liquid component protects the conductive polymer component and suppresses oxidation degradation of the conductive polymer component. A decrease in conductivity due to oxidation degradation of the conductive polymer component is suppressed, and an increase in ESR due to the decrease in conductivity is suppressed. Further, the liquid component repairs a defect portion of the dielectric layer and suppresses an increase in leak current due to the defect of the dielectric layer.

The first polymer component includes a carbon chain whose main chain does not contain a heteroatom at position other than a terminal of the main chain. In this case, under a high temperature, cutting of the main chain and reduction in molecular weight by the cutting are suppressed, and the first polymer component is less likely to permeate through the sealing body disposed in the opening of the case that contains the capacitor element and the liquid component. Thus, when the electrolytic capacitor is exposed to a high temperature for a long time, the above effect of the liquid component containing the first polymer component is maintained, and the heat resistance of the electrolytic capacitor improves. The terminal of the main chain may contain a heteroatom but does not have to contain a heteroatom.

The units constituting the first polymer component include at least one first unit selected from the group consisting of a (meth)acrylic acid-based unit having a carboxy group and a vinyl alcohol-based unit having a hydroxy group. The proportion of the first unit in an entirety of the units constituting the first polymer component is more than 50 mass %. The first polymer component containing the first unit in an amount of more than or equal to 50 mass % considerably suppresses a decrease in conductivity of the conductive polymer component.

The "(meth)acrylic acid-based unit" is at least one selected from the group consisting of acrylic acid-based units and methacrylic acid-based units. The (meth)acrylic acid-based unit is derived from at least one monomer selected from the group consisting of (meth)acrylic acids and derivatives thereof. The vinyl alcohol-based unit is derived from at least one monomer selected from the group consisting of vinyl alcohol and derivatives thereof.

When the first polymer component contains a (meth) acrylic acid-based unit having a carboxy group, it is easy to adjust the pH of the liquid component appropriately low, and when the conductive polymer component contains a dopant, dedoping of the dopant is likely to be suppressed, and a decrease in conductivity of the conductive polymer component due to the dedoping is likely to be suppressed.

When the first polymer component contains a vinyl alcohol-based unit having a hydroxy group, permeability of the liquid component into the capacitor element (solid electrolyte layer) is likely to improve. Thus, the conductive polymer component is likely to be protected, and a decrease in conductivity due to oxidative degradation of the conductive polymer component is likely to be suppressed. Further, diffusion of ions is suppressed, and the withstand voltage is likely to improve.

The first polymer component may contain, as the first unit, both a (meth)acrylic acid-based unit having a carboxy group and a vinyl alcohol-based unit having a hydroxy group, and may include these units in a total amount of more than 50 mass %. The first polymer component may contain a first polymer component containing more than 50 mass % of a (meth)acrylic acid-based unit having a carboxy group and a first polymer component containing more than 50 mass % of a vinyl alcohol-based unit having a hydroxy group. In the first polymer component, a molar ratio (OH/COOH) of hydroxy groups to carboxy groups may be from 0.1 to 10, inclusive.

The first polymer component preferably contains at least one selected from the group consisting of poly(meth)acrylic acid, polyvinyl alcohol, copolymers of (meth)acrylic acids and vinyl alcohol, and derivatives thereof. The "poly(meth) acrylic acid" is at least one selected from the group consisting of polyacrylic acid, polymethacrylic acid, and a copolymer of acrylic acid and methacrylic acid. The (meth) acrylic acid is at least one selected from the group consisting of acrylic acid and methacrylic acid. The copolymer may be a random copolymer or a block copolymer.

The number of carbon atoms in the main chain (carbon chain) of the first polymer component is preferably from 4 to 1000, inclusive, and more preferably from 10 to 500, inclusive. When the carbon number of the main chain is more than or equal to 4, the first polymer component hardly permeates through the sealing body, and the effect of the liquid component containing the first polymer component is likely to be maintained. When the carbon number of the main chain is less than or equal to 1000, permeability of the first polymer component into the capacitor element is likely to be secured.

From the viewpoint of suppressing a decrease in conductivity of the conductive polymer component and securing the permeability of the first polymer component into the capacitor element, the weight-average molecular weight (Mw) of the first polymer component is preferably from 200 to 20,000, inclusive, and more preferably from 300 to 2000, inclusive. The weight-average molecular weight (Mw) is a value in terms of polystyrene measured by gel permeation chromatography (GPC). The GPC is typically measured using a polystyrene gel column, and water and methanol (volume ratio: 8/2) as a mobile phase.

In the carbon chain included in the main chain of the first polymer component, it is desirable that all carbon-carbon bonds are single bonds and do not contain a double bond or a triple bond. The first polymer component may have a heteroatom at the terminal of the main chain. Examples of the heteroatom include an oxygen atom, a nitrogen atom, and a sulfur atom.

The proportion of the first unit in an entirety of the units constituting the first polymer component is more than 50 mass %, and may be more than or equal to 60 mass %, more than or equal to 80 mass %, or 100 mass %.

The units constituting the first polymer component may further include a second unit. Examples of the second unit include an alkylene unit having 2 to 3 carbon atoms (ethylene unit, propylene unit). The copolymer containing the first unit and the second unit may be a random copolymer or a block copolymer.

From the viewpoint that the above-described effect from the first polymer component is likely to be obtained, the content proportion of the first polymer component in the liquid component is preferably more than or equal to 10 mass %, and more preferably more than or equal to 20 mass % (or more than or equal to 30 mass %). In this case, even when the liquid component contains a solvent that is relatively easily volatilized, such as ethylene glycol, the amount of permeation of the liquid component through the sealing body can be sufficiently reduced by containing the first polymer component in the above range in the liquid component. From the viewpoint of easily adjusting the liquid component to have an appropriate viscosity and easily dissolving the first polymer component in the solvent, the content proportion of the first polymer component in the liquid component may be less than or equal to 50 mass %, less than or equal to 40 mass %, or less than or equal to 30 mass %.

For analysis of the first polymer component contained in the liquid component, for example, pyrolysis gas chromatography mass spectrometry (pyrolysis GC-MS), nuclear magnetic resonance spectroscopy (measurement by $H^1$-NMR), or the like may be used.

The liquid component may contain another polymer component (second polymer component) in addition to the first polymer component. Examples of the second polymer component include a polyalkylene glycol (for example, polyethylene glycol). The proportion of the first polymer component to the total of the first polymer component and the second polymer component may be more than or equal to 50 mass % (or more than or equal to 70 mass %), and almost all the polymer components contained in the liquid component may be the first polymer component. Even when the molecular weight of the polyalkylene glycol is reduced at a high temperature and the polyalkylene glycol permeates through the scaling body, the conductive polymer component is protected by the first polymer component, and the restoration property of the defective portion of the dielectric layer is maintained.

The liquid component may contain the first polymer component in a dissolved (or dispersed) state. The liquid component may contain a solvent. One type of the solvent may be used singly, or two or more types may be used in combination. From the viewpoint of the permeability of the liquid component into the solid electrolyte layer, the liquid component preferably contains an alcohol-based solvent. The alcohol-based solvent contains at least one of a monohydric alcohol and a polyhydric alcohol (hereinafter, it is also referred to as a polyol-based solvent). The alcohol-based solvent preferably contains a polyol-based solvent.

The polyol-based solvent preferably contains at least one selected from the group consisting of a glycol compound, a glycerin compound, and derivatives thereof. In this case, it is easy to adjust the viscosity of the liquid component containing the first polymer component to be appropriately low, and a high permeability of the liquid component into the capacitor element (solid electrolyte layer) is likely to be obtained. In addition, the orientation of the conductive polymer component is improved by swelling, and the conductivity is likely to be improved. High restorability of the dielectric layer is likely to be obtained.

The glycol compound is preferably, for example, an alkylene glycol having 2 to 8 (or 2 to 6) carbon atoms or a polyalkylene glycol. Examples of the alkylene glycol having 2 to 8 carbon atoms include ethylene glycol, propylene glycol (1,2-propanediol), trimethylene glycol (1,3-propanediol), diethylene glycol, triethylene glycol, and tetraethylene glycol. Examples of the polyalkylene glycol include polyethylene glycol, polypropylene glycol, and a copolymer of ethylene glycol and propylene glycol. The weight-average molecular weight of the ethylene glycol is, for example, less than or equal to 1000 from the viewpoint of the viscosity of the liquid component, and may be from 300 to 1000, inclusive, from the viewpoint of suppressing volatilization. The weight-average molecular weight of the polypropylene glycol is, for example, less than or equal to 5000 from the viewpoint of the viscosity of the liquid component, and may be from 200 to 5000, inclusive, from the viewpoint of suppressing volatilization.

Of these, the glycol compound is preferably ethylene glycol, diethylene glycol, triethylene glycol, tetraethylene glycol, or polyethylene glycol. One type of the glycol compound may be used singly, or two or more types may be used in combination.

Examples of the derivative of the glycol compound include a compound in which one or both terminals of the main chain of the polyalkylene glycol are etherified or esterified. The etherified terminal may be, for example, a —OR group. The esterified terminal may be, for example, a —OC(=O)R group. R is an organic group such as an alkyl group.

Examples of the glycerin compound include glycerin and polyglycerin. One type of the glycerin compound may be used singly, or two or more types may be used in combination.

The alcohol-based solvent may permeate through the sealing body and decrease in amount at a high temperature, but the conductive polymer component is protected by the first polymer component contained in the liquid component, and the restoration property of the defective portion of the dielectric layer is maintained. Even when a solvent that is relatively easily volatilized, such as ethylene glycol, is used, the amount of the liquid component that permeates through the sealing body can be sufficiently reduced by containing an appropriate amount of the first polymer component.

The proportion of the alcohol-based solvent in an entirety of the solvent contained in the liquid component may be more than or equal to 50 mass %, more than or equal to 80 mass %, or 100 mass %. The liquid component may contain a solvent other than the alcohol-based solvent. Examples of the solvent other than the alcohol-based solvent include a sulfone compound, a lactone compound, and a carbonate compound.

Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoroethylene carbonate.

The liquid component may contain an acid component. When the conductive polymer component contains a dopant, the acid component in the liquid component suppresses a dedoping phenomenon of the dopant and stabilizes conductivity of the conductive polymer component. Even when the dopant is dedoped from the conductive polymer component, the ESR is likely to be maintained low since a dedoped site is re-doped with the acid component. When the first polymer component contains a (meth)acrylic acid-based unit having a carboxy group, the first polymer component may be contained as an acid component.

It is desirable that the acid component in the liquid component does not excessively increase the viscosity of the liquid component, and generates an anion that easily dissociates in the liquid component and easily moves in the solvent. Examples of such an acid component include aliphatic sulfonic acids having 1 to 30 carbon atoms and aromatic sulfonic acids having 6 to 30 carbon atoms. As the aliphatic sulfonic acid, monovalent saturated aliphatic sulfonic acid (e.g., hexanesulfonic acid) is preferable. As the aromatic sulfonic acid, an aromatic sulfonic acid having a hydroxy group or a carboxy group in addition to a sulfo group is preferable, and specifically, an oxyaromatic sulfonic acid (e.g., phenol-2-sulfonic acid) and a sulfoaromatic carboxylic acid (e.g., p-sulfobenzoic acid, 3-sulfophthalic acid, or 5-sulfosalicylic acid) are preferable.

Examples of other acid components include a carboxylic acid. The carboxylic acid preferably contains an aromatic carboxylic acid having two or more carboxyl groups (aromatic dicarboxylic acid). Examples of the aromatic carboxylic acid include phthalic acid (ortho form), isophthalic acid (meta form), terephthalic acid (para form), maleic acid, benzoic acid, salicylic acid, trimellitic acid, and pyromellitic acid. In particular, aromatic dicarboxylic acid such as phthalic acid (ortho form) or maleic acid is more preferable. The carboxyl group of the aromatic dicarboxylic acid is stable and is less likely to cause a side reaction to proceed. This causes an effect of stabilizing the conductive polymer component to be exhibited over a long period of time, which is advantageous in prolonging the life of the electrolytic capacitor. The carboxylic acid may be an aliphatic carboxylic acid such as adipic acid.

The acid component may contain a composite compound of an organic acid and an inorganic acid in terms of thermal stability. Examples of the composite compound of an organic acid and an inorganic acid include borodisalicylic acid, borodioxalic acid, and borodiglycolic acid that have high heat resistance. The acid component may include an inorganic acid such as boric acid, phosphoric acid, phosphorous acid, hypophosphorous acid, or phosphonic acid.

From the viewpoint of enhancing an effect of suppressing the dedoping phenomenon, the concentration of the acid component may be from 5 mass % to 50 mass %, inclusive, or may be from 15 mass % to 35 mass %, inclusive.

The liquid component may contain a base component together with an acid component. At least a part of the acid component is neutralized by the base component. This can suppress corrosion of an electrode due to the acid component while increasing the acid component in concentration. From the viewpoint of effectively suppressing dedoping, the acid component is preferably more excessive than the base component in terms of equivalent ratio. For example, the equivalent ratio of the acid component to the base component may be from 1 to 30, inclusive. The concentration of the base component in the liquid component may be from 0.1 mass % to 20 mass %, inclusive, or may be from 3 mass % to 10 mass %, inclusive.

The base component is not particularly limited. Examples of the base component include ammonia, primary amine, secondary amine, tertiary amine, a quaternary ammonium compound, and an amidinium compound. Examples of each amine include aliphatic amine, aromatic amine, and heterocyclic amine. Examples of the amine include trimethylamine, diethylamine, ethyldimethylamine, triethylamine, ethylenediamine, aniline, pyrrolidine, imidazole (e.g., 1,2,3,4-tetramethylimidazolinium), and 4-dimethylaminopyridine. Examples of the quaternary ammonium compound include amidine compounds (also containing imidazole compounds).

The pH of the liquid component is preferably less than or equal to 4, more preferably less than or equal to 3.8, still more preferably less than or equal to 3.6. When the pH of the liquid component is less than or equal to 4, deterioration of the conductive polymer component is further suppressed. The pH is preferably more than or equal to 2.

(Capacitor Element)

The capacitor element includes an anode body that includes a dielectric layer on the surface of the anode body and a solid electrolyte layer that covers a part of the dielectric layer. The solid electrolyte layer contains a conductive polymer component.

(Anode Body)

The anode body may include a valve metal, an alloy containing the valve metal, and a compound containing the valve metal. These materials may be used singly or in combination of two or more thereof. Preferably available examples of the valve metal include aluminum, tantalum, niobium, and titanium. The anode body having a porous surface is obtained, for example, by roughening a surface of a base material (such as a foil-shaped or plate-shaped base material) containing the valve metal by etching or the like. The anode body may be a molded body of particles containing the valve metal or a sintered body thereof. The sintered body has a porous structure.

(Dielectric Layer)

The dielectric layer is formed by anodizing the valve metal of the surface of the anode body by anodizing treatment or the like. The dielectric layer covers at least a part of the anode body. Usually, the dielectric layer is formed on the surface of the anode body. Since the dielectric layer is formed on a porous surface of the anode body, the dielectric layer is formed along inner wall surfaces of holes and hollows (pits) in the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited to the ones described above, and any dielectric layer may be used as long as the dielectric layer functions as a dielectric body. When the anode body has a porous surface, the dielectric layer is formed along the surface of the anode body (including inner wall surfaces of holes).

(Solid Electrolyte Layer)

The solid electrolyte layer covers at least a part of the dielectric layer. The solid electrolyte layer contains a conductive polymer component. The solid electrolyte layer may be formed by attaching the conductive polymer component to at least a part of the surface of the dielectric layer. The conductive polymer component may further contain an additive agent as necessary. The conductive polymer component may be further attached to the surface of a cathode body or a separator.

The conductive polymer component contains, for example, a conjugated polymer component. Examples of the conjugated polymer component include known conjugated polymer components used in electrolytic capacitors, such as x-conjugated polymer components. Examples of the conjugated polymer component include polymer components having polypyrrole, polythiophene, polyaniline, polyfuran, polyacetylene, polyphenylene, polyphenylene vinylene, polyacene, and polythiophene vinylene as a basic skeleton. The polymer component is required to contain at least one type of monomer unit constituting the basic skeleton. The polymer component also contains a homopolymer, a copolymer of two or more types of monomers, and derivatives of these polymers (a substitution product having a substituent group or the like). For example, polythiophene contains poly(3,4-ethylenedioxythiophene) and the like. As the conjugated polymer component, one type may be used singly, or two or more types may be used in combination.

A weight-average molecular weight (Mw) of the conjugated polymer component is not particularly limited and is, for example, from 1,000 to 1,000,000, inclusive. The weight-average molecular weight (Mw) is a value in terms of polystyrene measured by gel permeation chromatography (GPC). The GPC is typically measured using a polystyrene gel column, and water and methanol (volume ratio: 8/2) as a mobile phase.

The conjugated polymer component may be doped with a dopant. The conductive polymer component may include a conjugated polymer component doped with a dopant.

Examples of the dopant include relatively low molecular anions and polymeric anions. Examples of the anion include a sulfate ion, a nitrate ion, a phosphate ion, a borate ion, an organic sulfonate ion, and a carboxylate ion. Compounds that produce these anions are used as dopants. Examples of the dopant that generates sulfonate ions include para-toluenesulfonic acid and naphthalenesulfonic acid.

A polymeric sulfonic acid may be used as the dopant that generates sulfonate ions. Examples of the polymeric sulfonic acid include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprenesulfonic acid. The polymeric anion may be a polymer of a single monomer, a copolymer of two or more monomers, or a substitution product having a substituent. Of these, a polyanion derived from polystyrenesulfonic acid is preferable. One type of the dopant may be used singly, or two or more types may be used in combination.

The solid electrolyte layer (conductive polymer component) may be formed, for example, by performing at least one of chemical polymerization and electrolytic polymerization of a precursor of the conjugated polymer component on the dielectric layer in the presence of a dopant. Alternatively, the solid electrolyte layer may be formed by bringing a dispersion liquid (or solution) of the conductive polymer component into contact with the dielectric layer. The conductive polymer component to be dispersed (dissolved) in a dispersion medium (solvent) may be obtained, for example, by polymerizing a precursor of the conjugated polymer component in the presence of a dopant. Examples of the precursor of the conjugated polymer component include a raw material monomer of the conjugated polymer component, and an oligomer and a prepolymer in which a plurality of molecular chains of the raw material monomer are linked. One type of the precursor may be used, or two or more types may be used in combination.

The amount of the dopant ranges, for example, from 10 parts by mass to 1000 parts by mass, inclusive, and may be from 20 parts by mass to 500 parts by mass, inclusive, or from 50 parts by mass to 200 parts by mass, inclusive, with respect to 100 parts by mass of the conjugated polymer component.

(Cathode Body)

A cathode body may be used, and a metal foil may be used for the cathode body, as in the case of the anode body. The type of the metal is not particularly limited, but it is preferable to use a valve metal such as aluminum, tantalum, or niobium or an alloy containing the valve metal. The surface of the metal foil may be roughened as necessary. The surface of the metal foil may be provided with an anodization film, and may be provided with a film of metal (dissimilar metal) different from the metal constituting the metal foil, or a nonmetal film. Examples of the dissimilar metal and the nonmetal include metals such as titanium and nonmetals such as carbon.

(Separator)

When a metal foil is used for the cathode body, a separator may be disposed between the metal foil and the anode body. The separator is not particularly limited. For example, an unwoven fabric including fibers of cellulose, polyethylene terephthalate, vinylon, or polyamide (for example, aliphatic polyamide or aromatic polyamide such as aramid) or the like may be used.

Figure 2:
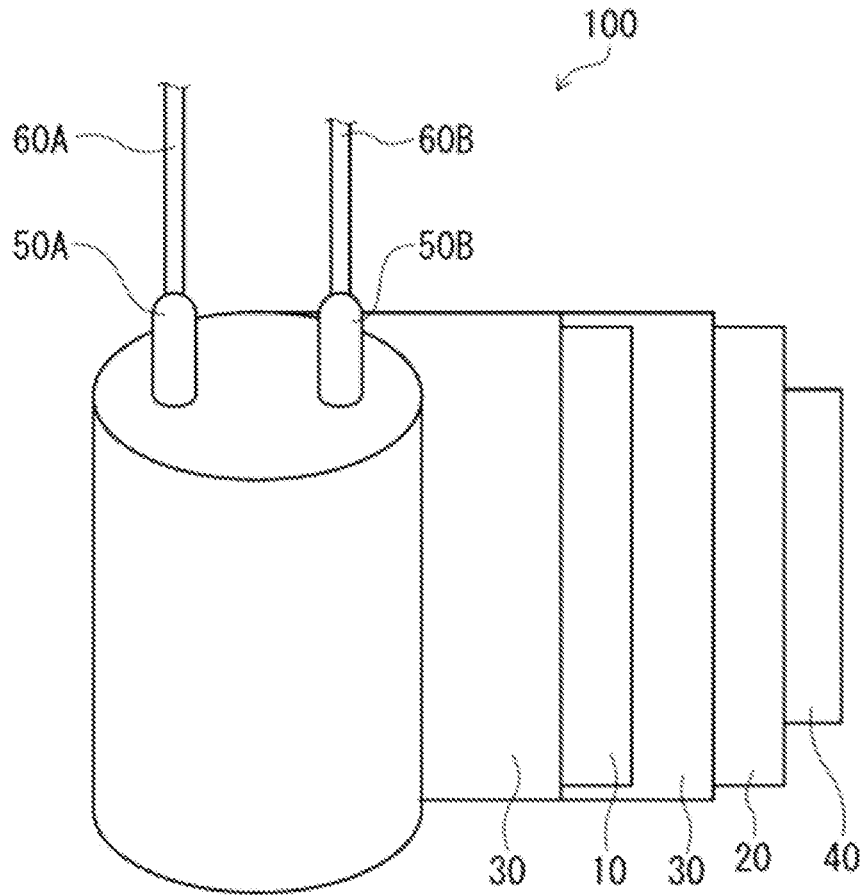
FIG. 2 is a perspective view schematically illustrating a configuration of a wound body.

Here, FIG. 1 is a sectional view schematically illustrating an electrolytic capacitor according to one exemplary embodiment of the present disclosure. FIG. 2 is a perspective view schematically illustrating a configuration of a wound body.

Electrolytic capacitor 200 includes a capacitor element and a liquid component (not illustrated). The capacitor element includes wound body 100 and a solid electrolyte layer (not illustrated). Wound body 100 is formed by winding anode body 10 having a dielectric layer on the surface of anode body 10 and cathode body 20 with separator 30 interposed therebetween. The solid electrolyte layer covers at least a part of the surface of anode body 10 (dielectric layer). The capacitor element (at least the solid electrolyte layer) is impregnated with the liquid component. A metal foil is used for each of anode body 10 and cathode body 20.

Winding stop tape 40 is disposed on an outer surface of cathode body 20 positioned at an outermost layer of wound body 100, and an end portion of cathode body 20 is fixed by winding stop tape 40. When anode body 10 is prepared by cutting a large foil, an anodizing treatment may further be performed on wound body 100 in order to provide a dielectric layer on a cut surface.

One ends of lead tabs 50A and 50B are connected to anode body 10 and cathode body 20, respectively. Lead wires 60A and 60B are connected to the other ends of lead tabs 50A and 50B, respectively.

The capacitor element and the liquid component are housed in bottomed case 211. As a material of bottomed case 211, a metal such as aluminum, stainless steel, copper, iron, or brass, or an alloy thereof may be used.

Sealing body 212 is disposed at an opening of bottomed case 211, an opening end of bottomed case 211 is caulked with sealing body 212 and curled, and base plate 213 is disposed at a curled portion, whereby the capacitor element and the liquid component are sealed in bottomed case 211.

Lead wires 60A, 60B penetrate the sealing body 212. As a material of sealing body 212, an elastic polymer material having insulating properties is preferable. In particular, silicone rubber, fluororubber, ethylene propylene rubber, chlorosulfonated polyethylene rubber (Hypalon rubber and the like), butyl rubber, isoprene rubber, or the like is preferable from the viewpoint of heat resistance.

The electrolytic capacitor may be a wound type, or may be either a chip type or a stack type. A chip-type or stack-type electrolytic capacitor may include a cathode layer (a carbon layer and a silver paste layer) covering the solid electrolyte layer. The electrolytic capacitor may include at least one capacitor element, and may include a plurality of capacitor elements. For example, the electrolytic capacitor may include a stack of two or more capacitor elements, or may include two or more wound-type capacitor elements. The configuration or number of the capacitor elements may be selected according to the type or use of the electrolytic capacitor.

EXAMPLES

Hereinafter, the present disclosure will be described in more detail based on Examples, but the present disclosure is not limited to Examples.

«Electrolytic Capacitors A1 to A5 and B1 to B3»

A wound electrolytic capacitor (diameter: 8 mm×length: 10 mm) having a rated voltage of 35 V and a rated capacitance of 150 µF was produced. A specific method for producing the electrolytic capacitor will be described below.

(Preparation of Anode Body)

An aluminum foil having a thickness of 100 µm was subjected to an etching treatment to roughen the surface of the aluminum foil. Then, a dielectric layer was formed on the surface of the aluminum foil by an anodizing treatment. The anodizing treatment was performed by immersing the aluminum foil in an ammonium adipate solution, followed by application of a voltage of 60 V. Then, the aluminum foil was cut, whereby an anode body was prepared.

(Preparation of Cathode Body)

An aluminum foil having a thickness of 50 µm was subjected to an etching treatment to roughen the surface of the aluminum foil. Then, the aluminum foil was cut, whereby a cathode body was prepared.

(Production of Wound Body)

An anode lead tab and a cathode lead tab were connected to the anode body and the cathode body, respectively, and the anode body and the cathode body were wound with a separator interposed between the anode body and the cathode body while the lead tabs were being wound. An anode lead wire and a cathode lead wire were connected to the end parts of the lead tabs protruding from the wound body, respectively. The produced wound body was subjected to an anodizing treatment again to form a dielectric layer on the cut end part of the anode body. Next, the end part of the outer surface of the wound body was fixed with a winding stop tape, whereby the wound body was produced.

(Preparation of Dispersion of Conductive Polymer Component)

A mixed solution was prepared by dissolving, in ion-exchanged water, 3,4-ethylenedioxythiophene (EDOT) and polystyrene sulfonic acid (PSS, weight-average molecular weight: 100,000) that is a dopant. While the mixed solution was being stirred, iron(III) sulfate (oxidizing agent) dissolved in ion-exchanged water was added to perform a polymerization reaction. After the reaction, the obtained reaction solution was dialyzed to remove the unreacted monomer and excess oxidant, whereby a polymer dispersion (hereinafter, a polymer dispersion) containing polyethylene dioxythiophene doped with about 5 mass % of PSS (PEDOT/PSS) was obtained.

(Formation of Solid Electrolyte Layer)

The wound body was immersed in the polymer dispersion in a decompressed atmosphere (40 kPa) for 5 minutes, and then the wound body was picked up from the polymer dispersion. Next, the wound body impregnated with the polymer dispersion was dried in a drying furnace at 150° C. for 20 minutes, and at least a part of the dielectric layer was covered with a conductive polymer, whereby a solid electrolyte layer was formed. A capacitor element was thus formed.

(Preparation of Liquid Component)

Liquid components shown in Table 1 were prepared. In A1 to A5, a liquid component containing a first polymer component and a solvent was prepared. In B1 to B3, a liquid component containing only a solvent was prepared without adding the first polymer component. As the first polymer component and the solvent, compounds shown in Table 1 were used. In Table 1, PAA is polyacrylic acid, PMA is polymethacrylic acid, PVA is polyvinyl alcohol, GBL is γ-butyrolactone, EG is ethylene glycol, and PEG is polyethylene glycol (weight-average molecular weight: 2000). The content proportion of each component in the liquid component was set to the value shown in Table 1.

(Assembling of Electrolytic Capacitor)

The capacitor element (wound body including a solid electrolyte layer) was immersed in the liquid component in a decompressed atmosphere (40 kPa) for 5 minutes to impregnate the capacitor element with the liquid component. The capacitor element impregnated with the liquid component was contained in a case. Thereafter, an opening of the case was sealed by using a sealing body containing butyl rubber as an elastic polymer. The electrolytic capacitor shown in FIG. 1 was thus completed. Thereafter, an aging treatment was performed at 130° C. for 2 hours while a rated voltage was applied to the electrolytic capacitor.

Each of the obtained electrolytic capacitors was evaluated as follows.

[Evaluation: High-Temperature Load Test]

An initial electrostatic capacity $C0$ (µF) at a frequency of 120 Hz was measured using an LCR meter for 4-terminal measurement under an environment of 20° C. A mass $M0$ of each electrolytic capacitor was measured.

Subsequently, the solid electrolytic capacitor was subjected to reflow treatment for 3 minutes under an environment of 260° C. After the reflow treatment, the electrolytic capacitor was contained in a thermostatic bath in a 145° C. atmosphere, and held for 2000 hours in a state where a rated voltage was applied, whereby a high-temperature load test was performed.

After the high-temperature load test, an electrostatic capacity $C1$ was measured in the same manner as described above under an environment of 20° C., and the ESR (mΩ) at a frequency of 100 kHz was further measured. A mass $M1$ of each electrolytic capacitor was measured.

Using the obtained $C0$ and $C1$, the capacitance change rate $\Delta C$ (%) was obtained by Formula (1) shown below.

$$\text{Capacitance change rate } \Delta C = \{(C1-C0)/C0\} \times 100 \qquad (1)$$

Using the mass M of the liquid component contained in the case together with the capacitor element and the $M0$ and $M1$ obtained above, the permeation amount (mass %) of the liquid component after the high-temperature load test was determined by Formula (2) shown below. The value obtained by subtracting $M1$ from $M0$ was regarded as the mass of the liquid component that had permeated through the sealing body.

$$\text{Permeation amount of liquid component} = \{(M0-M1)/M\} \times 100 \qquad (2)$$

Evaluation results are shown in Table 1. In Table 1, A1 to A5 are Examples, and B1 to B3 are Comparative Examples.

TABLE 1

| Electrolytic capacitor | Liquid component | | | | | High-temperature load test (145° C., 2000 h) | | |
| | First polymer component | | | Solvent | | Capacitance change rate ΔC (%) | ESR (mΩ) | Permeation amount of liquid component (mass %) |
| | Compound | Weight-average molecular weight | Content proportion (mass %) | Compound | Content proportion (mass %) | | | |
| B3 | — | — | — | GBL | 100 | −89 | 39 | 89 |
| B1 | — | — | — | EG | 100 | −60 | 25 | 54 |
| B2 | — | — | — | PEG | 100 | −37 | 28 | 33 |
| A1 | PAA | 1000 | 30 | EG | 70 | −28 | 18 | 20 |
| A2 | PAA | 1000 | 30 | PEG | 70 | −12 | 12 | 13 |
| A3 | PAA | 1000 | 30 | Glycerin | 70 | −14 | 12 | 10 |
| A4 | PMA | 1000 | 30 | EG | 70 | −25 | 19 | 22 |
| A5 | PVA | 1000 | 30 | EG | 70 | −26 | 20 | 22 |

PAA: polyacrylic acid,
PMA: polymethacrylic acid,
PVA: polyvinyl alcohol,
EG: ethylene glycol,
GBL: γ-butyrolactone,
PEG: polyethylene glycol In electrolytic capacitors B1 to B2 using an alcohol-based solvent, the ESR was small to some extent as compared with electrolytic capacitor B3 using GBL as a solvent, but since the first polymer component was not added to the liquid component in any case, the permeation amount of the liquid component during the high-temperature load test was large, the performance after the high-temperature load test was deteriorated, and the heat resistance was low. EG, which is the alcohol-based solvent used in electrolytic capacitor B1, was easily volatilized, and the amount of the liquid component permeated through the sealing body increased during the high-temperature load test. PEG, which is the alcohol-based solvent used in electrolytic capacitor B2, was less likely to be volatilized as compared with EG, but during the high-temperature load test, the C—O bonds of the main chain of PEG were cut to reduce the molecular weight of PEG, and the amount of the liquid component permeated through the sealing body increased.

In electrolytic capacitor A2 using the liquid component containing PEG and the first polymer component, reduction of the liquid component in the electrolytic capacitor because of permeation through the sealing body was suppressed, the reduction rate of ΔC was small, the ESR was small, and excellent heat resistance was obtained, as compared with electrolytic capacitor B2.

In electrolytic capacitor A1 using the liquid component containing EG and the first polymer component, the perme-ation amount of the liquid component was smaller than that in electrolytic capacitor B1, and excellent heat resistance was obtained. In electrolytic capacitor B1, since the first polymer component was not added to EG, the permeation amount of the liquid component increased. Even when EG which is relatively easily volatilized was contained, the permeation amount of the liquid component was able to be reduced by containing the first polymer component.

Also in electrolytic capacitor A4 using PMA as the first polymer component and electrolytic capacitor A5 using PVA as the first polymer component, the permeation amount of the liquid component was small, and excellent heat resis-tance was obtained like electrolytic capacitor A1 using PAA as the first polymer component. Also in electrolytic capaci-tor A3 using the liquid component containing glycerin and the first polymer component, the permeation amount of the liquid component was small, and excellent heat resistance was obtained.

«Electrolytic Capacitors A6 and A7»

Electrolytic capacitors A6 and A7 were produced and evaluated in the same manner as in electrolytic capacitor A1 except that the content proportions of the solvent and the first polymer component were changed to the values shown in Table 2. The evaluation results of electrolytic capacitors A6 and A7 are shown in Table 2 together with electrolytic capacitors B1 and A1. In the table, A6 and A7 are Examples.

TABLE 2

| Electrolytic capacitor | Liquid component | | | | | High-temperature load test (145° C., 2000 h) | | |
| | First polymer component | | | Solvent | | Capacitance change rate ΔC (%) | ESR (mΩ) | Permeation amount of liquid component (mass %) |
| | Compound | Weight-average molecular weight | Content proportion (mass %) | Compound | Content proportion (mass %) | | | |
| B1 | — | — | — | EG | 100 | −60 | 25 | 54 |
| A6 | PAA | 1000 | 10 | EG | 90 | −56 | 19 | 37 |
| A1 | PAA | 1000 | 30 | EG | 70 | −28 | 18 | 20 |
| A7 | PAA | 1000 | 50 | EG | 50 | −22 | 14 | 10 |

PAA: polyacrylic acid,
EG: ethylene glycol

In the electrolytic capacitor in which the content proportion of the first polymer component was more than or equal to 10 mass %, the permeation amount of the liquid component was reduced, and good heat resistance was obtained. In particular, in electrolytic capacitors A1 and A7 in which the content proportion of the first polymer component was more than or equal to 20 mass %, the permeation amount of the liquid component was further reduced, and the reduction rate of $\Delta C$ and the ESR were further reduced.

«Electrolytic Capacitors A8 to A12»

Electrolytic capacitors A8 to A12 were produced and evaluated in the same manner as electrolytic capacitor A1 except that PAA having a weight-average molecular weight as shown in Table 3 was used as the first polymer component. The evaluation results are shown in Table 3 together with electrolytic capacitor A1. In the table, A8 to A12 are Examples.

TABLE 3

| Electrolytic capacitor | Liquid component | | | | | High-temperature load test (145° C., 2000 h) | | |
| | First polymer component | | | Solvent | | Capacitance change rate $\Delta C$ (%) | ESR (mΩ) | Permeation amount of liquid component (mass %) |
| | Compound | Weight-average molecular weight | Content proportion (mass %) | Compound | Content proportion (mass %) | | | |
| A8 | PAA | Less than 200 | 30 | EG | 70 | −48 | 25 | 24 |
| A9 | PAA | 200 | 30 | EG | 70 | −33 | 20 | 22 |
| A1 | PAA | 1000 | 30 | EG | 70 | −28 | 18 | 20 |
| A10 | PAA | 10000 | 30 | EG | 70 | −25 | 14 | 14 |
| A11 | PAA | 20000 | 30 | EG | 70 | −26 | 16 | 13 |
| A12 | PAA | 25000 | 30 | EG | 70 | −24 | 18 | 14 |

PAA: polyacrylic acid,
EG: ethylene glycol

In any of the electrolytic capacitors, the permeation amount of the liquid component was reduced by the addition of PAA, and good heat resistance was obtained. In the electrolytic capacitors using the liquid component containing PAA having a weight-average molecular weight of more than or equal to 200, the permeation amount of the liquid component was further reduced, and the reduction rate of $\Delta C$ and the ESR were further reduced. In the case of the liquid component containing PAA having a weight-average molecular weight of less than or equal to 20,000, the liquid component (PAA) was likely to be penetrated into the capacitor element.

NOTE

The above description of the exemplary embodiments discloses the following technologies.

Technology 1

An electrolytic capacitor including:
a capacitor element; and
a liquid component, wherein:
the capacitor element includes an anode body including a dielectric layer on a surface of the anode body, and a solid electrolyte layer covering at least a part of a surface of the dielectric layer,
the solid electrolyte layer contains a conductive polymer component,
the liquid component contains a first polymer component, the first polymer component includes a carbon chain whose main chain does not contain a heteroatom at a position other than a terminal of the main chain,
units constituting the first polymer component include at least one first unit selected from the group consisting of a (meth)acrylic acid-based unit having a carboxy group and a vinyl alcohol-based unit having a hydroxy group, and
a proportion of the at least one first unit in an entirety of the units constituting the first polymer component is more than 50 mass %.

Technology 2

The electrolytic capacitor according to Technology 1, wherein a number of carbon atoms in the main chain ranges from 4 to 1000, inclusive.

Technology 3

The electrolytic capacitor according to Technology 1 or 2, wherein a weight-average molecular weight of the first polymer component ranges from 200 to 20,000, inclusive.

Technology 4

The electrolytic capacitor according to any one of Technologies 1 to 3, wherein the first polymer component contains at least one selected from the group consisting of poly(meth)acrylic acid, polyvinyl alcohol, and a copolymer of (meth)acrylic acid and vinyl alcohol.

Technology 5

The electrolytic capacitor according to any one of Technologies 1 to 4, wherein a content proportion of the first polymer component in the liquid component is more than or equal to 10 mass %.

Technology 6

The electrolytic capacitor according to any one of Technologies 1 to 5, wherein the liquid component contains an alcohol-based solvent.

Technology 7

The electrolytic capacitor according to Technology 6, wherein the alcohol-based solvent contains at least one selected from the group consisting of a glycol compound, a glycerin compound, and a derivative thereof.

Technology 8

The electrolytic capacitor according to Technology 7, wherein the alcohol-based solvent contains at least one selected from the group consisting of ethylene glycol, diethylene glycol, triethylene glycol, tetraethylene glycol, polyethylene glycol, glycerin, and polyglycerin.

Technology 9

A liquid component for an electrolytic capacitor, the liquid component being used for the electrolytic capacitor including a solid electrolyte layer containing a conductive polymer component, the liquid component including a first polymer component, wherein:

the first polymer component includes a carbon chain whose main chain does not contain a heteroatom at a position other than a terminal of the main chain, units constituting the first polymer component includes at least one first unit selected from the group consisting of a (meth)acrylic acid-based unit having a carboxy group and a vinyl alcohol-based unit having a hydroxy group, and a proportion of the at least one first unit in an entirety of the units constituting the first polymer component is more than 50 mass %.

Technology 10

The liquid component according to Technology 9, wherein a number of carbon atoms in the main chain ranges from 4 to 1000, inclusive.

Technology 11

The liquid component according to Technology 9 or 10, wherein a weight-average molecular weight of the first polymer component ranges from 200 to 20,000, inclusive.

Technology 12

The liquid component according to any one of Technologies 9 to 11, wherein the first polymer component contains at least one selected from the group consisting of poly(meth) acrylic acid, polyvinyl alcohol, and a copolymer of (meth) acrylic acid and vinyl alcohol.

The liquid component for an electrolytic capacitor according to the present disclosure is suitably used for an electrolytic capacitor requiring excellent heat resistance.

What is claimed is:

1. An electrolytic capacitor comprising:

a capacitor element; and a liquid component, wherein:

the capacitor element includes an anode body including a dielectric layer on a surface of the anode body, and a solid electrolyte layer covering at least a part of a surface of the dielectric layer, the solid electrolyte layer contains a conductive polymer component, the liquid component contains a first polymer component, the first polymer component includes a carbon chain whose main chain does not contain a heteroatom at a position other than a terminal of the main chain, units constituting the first polymer component include at least one first unit selected from the group consisting of a (meth)acrylic acid-based unit having a carboxy group and a vinyl alcohol-based unit having a hydroxy group, a proportion of the at least one first unit in an entirety of the units constituting the first polymer component is more than 50 mass %, and a number of carbon atoms in the main chain ranges from 4 to 1000, inclusive.

2. The electrolytic capacitor according to claim 1, wherein a weight-average molecular weight of the first polymer component ranges from 200 to 20,000, inclusive.

3. The electrolytic capacitor according to claim 1, wherein the first polymer component contains at least one selected from the group consisting of poly(meth)acrylic acid, polyvinyl alcohol, and a copolymer of (meth)acrylic acid and vinyl alcohol.

4. The electrolytic capacitor according to claim 1, wherein a content proportion of the first polymer component in the liquid component is more than or equal to 10 mass %.

5. The electrolytic capacitor according to claim 1, wherein the liquid component contains an alcohol-based solvent.

6. The electrolytic capacitor according to claim 5, wherein the alcohol-based solvent contains at least one selected from the group consisting of a glycol compound, a glycerin compound, and a derivative thereof.

7. The electrolytic capacitor according to claim 6, wherein the alcohol-based solvent contains at least one selected from the group consisting of ethylene glycol, diethylene glycol, triethylene glycol, tetraethylene glycol, polyethylene glycol, glycerin, and polyglycerin.

8. A liquid component for an electrolytic capacitor, the liquid component being used for the electrolytic capacitor including a solid electrolyte layer containing a conductive polymer component, the liquid component including a first polymer component, wherein:

the first polymer component includes a carbon chain whose main chain does not contain a heteroatom at a position other than a terminal of the main chain, units constituting the first polymer component include at least one first unit selected from the group consisting of a (meth)acrylic acid-based unit having a carboxy group and a vinyl alcohol-based unit having a hydroxy group, a proportion of the at least one first unit in an entirety of the units constituting the first polymer component is more than 50 mass %, and a number of carbon atoms in the main chain ranges from 4 to 2000, inclusive.

9. The liquid component according to claim 8, wherein a weight-average molecular weight of the first polymer component ranges from 200 to 20,000, inclusive.

10. The liquid component according to claim 8, wherein the first polymer component contains at least one selected from the group consisting of poly(meth)acrylic acid, polyvinyl alcohol, and a copolymer of (meth)acrylic acid and vinyl alcohol.

* * * * *